United States Patent [19]

Scott

[11] Patent Number: 4,515,055

[45] Date of Patent: May 7, 1985

[54] CIRCULAR SAW BLADE

[75] Inventor: Lewis A. Scott, Lake Oswego, Oreg.

[73] Assignee: Omark Industries, Inc., Portland, Oreg.

[21] Appl. No.: 560,587

[22] Filed: Dec. 12, 1983

Related U.S. Application Data

[60] Division of Ser. No. 404,850, Aug. 3, 1982, Pat. No. 4,432,264, which is a continuation-in-part of Ser. No. 292,572, Aug. 13, 1981, abandoned.

[51] Int. Cl.³ .................... B27B 33/08; B23D 61/04
[52] U.S. Cl. ........................... 83/835; 83/854; 83/855
[58] Field of Search ............... 83/835, 838, 839, 852, 83/854, 855

[56] References Cited

U.S. PATENT DOCUMENTS

| | | | |
|---|---|---|---|
| 1,811,079 | 6/1931 | Forsyth | 83/835 |
| 3,183,947 | 5/1965 | Johnson et al. | 83/839 |
| 3,362,446 | 1/1968 | Potomak | 83/835 |
| 3,866,504 | 2/1975 | Claesson et al. | 83/854 |
| 4,135,421 | 1/1979 | Bertram et al. | 83/854 |

Primary Examiner—Donald R. Schran
Attorney, Agent, or Firm—John W. Stuart

[57] ABSTRACT

A circular saw blade having a plurality of circumferentially-spaced cutter teeth projecting radially outwardly therefrom. A portion of the periphery of the blade rises gradually as it progresses toward the front face of a tooth to provide a depth gauge to control depth of cut. A chip clearing channel extends radially inwardly along the body of the blade adjacent the front face of the tooth. A pocket formed in the body has edge margins which receive and support front and rear surfaces of a cutter tip.

9 Claims, 8 Drawing Figures

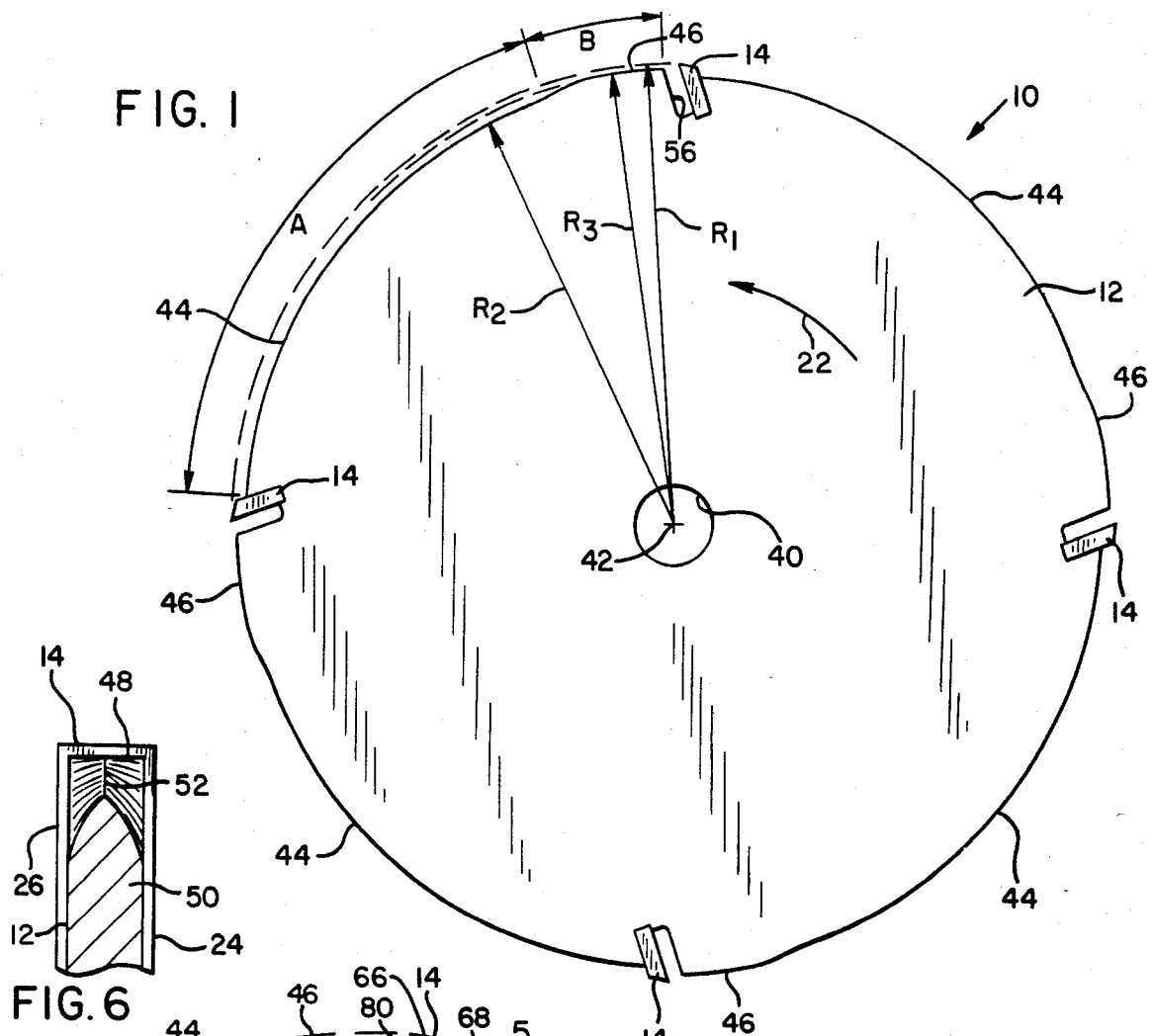
FIG. 1
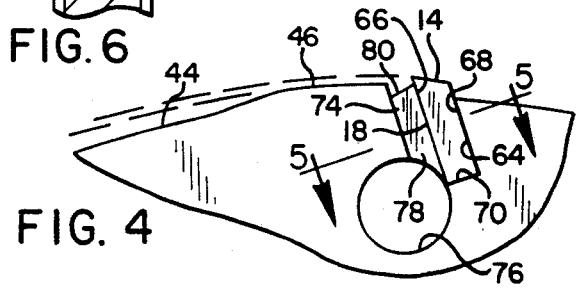
FIG. 6
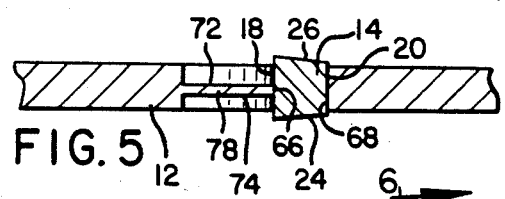
FIG. 4
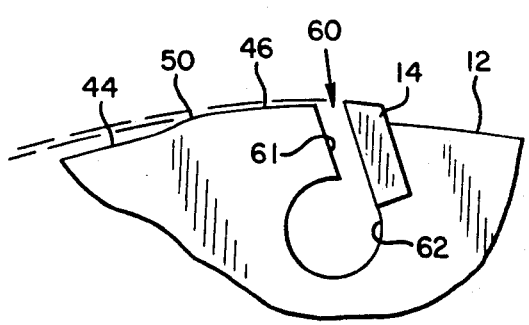
FIG. 3
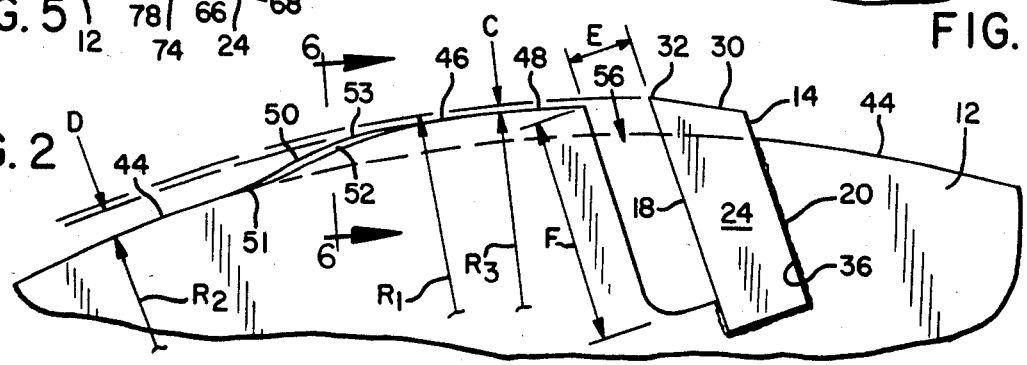
FIG. 5
FIG. 2

1

CIRCULAR SAW BLADE

BACKGROUND AND SUMMARY OF THE INVENTION

This application is a division of application Ser. No. 404,850, filed Aug. 3, 1982, now U.S. Pat. No. 4,432,264 which is a continuation-in-part of prior U.S. patent application, Ser. No. 292,572, filed Aug. 13, 1981 now abandoned.

This invention relates to a circular saw blade provided with a ramp-like depth gauge portion on its periphery adjacent the front surface of a cutter tooth thereon, a chip clearing channel extending radially inwardly from the periphery of the blade adjacent the front surface of the cutter tooth, and body portions which engage and support both front and rear surfaces of a tip element forming a cutter tooth in the blade.

In the past circular saw blades generally have had relatively closely-spaced teeth arrayed about their peripheries. This has been thought to be necessary to limit the depth of cut each tooth takes as the blade is moved into the work piece. Should the blade be forced to take too great a cut in the work piece, or should it engage a harder than usual material, damage to the teeth and overloading of the saw can occur if the depth of cut is not controlled. This is so even with blades having hardened cutter tips, such as carbide tipped blades.

Such blades are constructed generally as illustrated in U.S. Pat. No. 3,176,732 with closely-spaced, radially projecting portions of the main body of the blade having notched regions into which carbide tips are placed and brazed. The teeth are relatively closely spaced together to control the depth of cut. If this were not done and a harder object, such as a nail, is encountered it could impact the carbide tip and either break it out or jam the blade, resulting in what is commonly referred to as kickback. Kickback occurs when the blade is overloaded, either by excessive feed force or engaging an article which it cannot easily cut, causing the energy of blade rotation to be transmitted to linear motion of the saw or work piece.

Even with closely spaced teeth as shown in the '732 patent, kickback can occur if a harder than expected object is allowed to enter the gullet between the back of one cutter and the front face of another.

As is seen in the U.S. Pat. No. 3,176,732, it is common in such blades to leave the forward face of the tip exposed. This makes it easier to assemble the parts, but it does not provide a support, other than the adhesion provided by the solder, against the tip being forced away from the body portion of the blade in the direction of the gullet. A tip can be broken out of the blade by the outer edge of the tip engaging a material which it cannot easily cut producing a leverage force on the remainder of the tip which will either break the tip or sever its bond with the parent metal. This can also occur if the operator mistakenly mounts the blade backwards and runs it into a work piece rotating in a direction opposite its intended operating direction.

A further disadvantage of piror blades is that the more teeth or tips that are required adds to the cost in time and material required to produce each blade.

In two prior patents of which applicant is aware mention is made of elements on the periphery of a blade serving to limit the depth of cut. These are patents to Weaver (U.S. Pat. No. 2,835,286) and Claesson et al (U.S. Pat. No. 3,866,504). These patents, however, deal only with formed metal blades with no attached hardened cutter tips. In Weaver straight line (as opposed to curved) peripheral surfaces terminate in sharp angles leading the cutter teeth. These are alleged to prevent a tooth from taking too deep a bite. However, it should be evident that the straight line peripheral edge between cutter teeth would not provide a smooth feeding operation. On a slowly rotating blade particularly a bumpy or erratic operation could occur.

In Claesson et al, straight line peripheral elements again are used in an attempt to limit the depth of cut of a cutter tooth. Such straight line configuration, being at a severe angle relative to the arc described by the cutter teeth also could produce bumpy and erratic operation of the saw.

Further, neither of these patents address the need to provide support or protection for the front face of a cutter tip assembled to the main body portion of the blade.

A general object of the present invention is to provide a novel circular saw blade having a plurality of circumferentially spaced cutter teeth thereon, with smoothly-curved, ramp-like depth gauge portions leading each cutter tooth to accurately control the depth of cut, while producing smooth operation.

Another object of the present invention is to provide a novel circular saw blade which is so constructed with smoothly-curved depth gauges thereon that a minimum number of cutter teeth may be provided on the blade and yet control of the depth of cut of each tooth is provided for smooth and efficient operation.

A still further object of the invention is to provide a circular saw blade having hardened tips secured to the periphery of a body portion of a softer material, which blade is so constructed that a portion of the body of the blade provides support for both the front and rear faces of the tip.

Yet another object of the invention is to provide in a circular saw blade novel chip clearance channels for efficiently clearing chips from the periphery of the blade during operation, which channels are large enough to provide adequate chip clearance, yet small enough to inhibit entry of material of a size that may produce kickback.

Another object of the invention is to provide a novel circular saw blade which operates efficiently and smoothly, yet may be produced economically with a minimum number of cutter teeth thereon.

DRAWINGS

These and other objects and advantages will become more fully apparent as the following description is read in conjunction with the drawings wherein;

FIG. 1 is a side elevation view of a circular saw blade constructed according to an embodiment of the invention;

FIG. 2 is an enlarged view of a segment of the periphery of the blade illustrated in FIG. 1;

FIG. 3 is an illustration, somewhat similar to FIG. 2, but on a smaller scale and illustrating a different form of chip clearance channel therein;

FIG. 4 is another illustration, somewhat similar to FIG. 2, showing another form of mounting a tip in the periphery of the blade and a different chip clearing channel configuration;

FIG. 5 is a cross-sectional view taken generally along the line 5—5 in FIG. 4;

FIG. 6 is a cross-sectional view taken generally along the line 6—6 in FIG. 2;

DESCRIPTIONS OF PREFERRED EMBODIMENTS OF THE INVENTION

Figure 7:
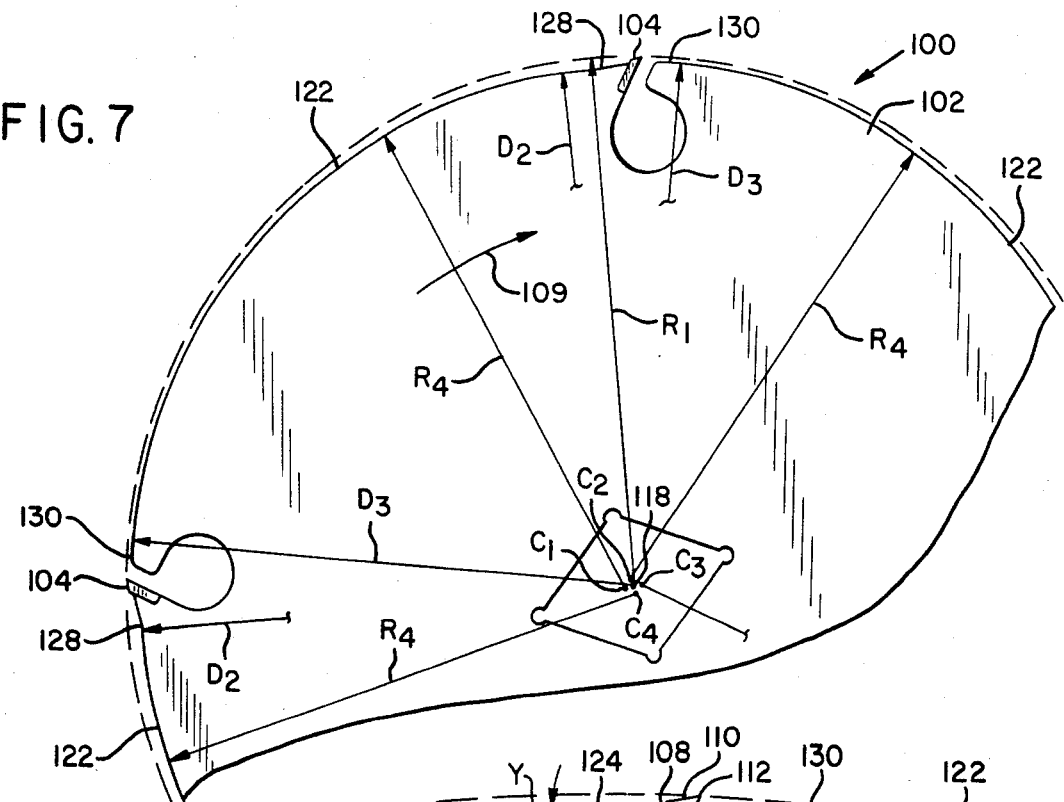
FIG. 7 is a side elevation view of a circular saw blade constructed according to another embodiment of the invention.

Referring first to FIG. 1, at 10 is indicated generally a blade constructed according to one embodiment of the invention. It includes a substantially circular main body 12 and a plurality of circumferentially spaced cutter tips, or teeth, 14 secured to and arrayed about the periphery of the body. The cutter tips may be of a hardened material, such as carbide, and the body of the blade is composed of a material of a lesser hardness, such as mild steel. The tips may be secured to the body by a conventional brazing procedure.

Referring to FIG. 2, a cutter tip has forward and rear surfaces 18, 20 respectively, with the forward, or front, surface facing in the direction of rotation of the blade during operation as indicated by arrow 22 in FIG. 1. The tip has opposed side surfaces 24, 26 and an outer, or top, surface 30. Cutting edges of the tip are provided at the intersections of surfaces 18-30, 18-24, and 18-26. The cutting edge between surfaces 18-30 is indicated at 32. Cutting edge 32 describes an arc at a first radius designated $R_1$ as it rotates with the blade during operation.

As is best illustrated in FIG. 2, a pocket 36 is formed in the peripheral edge of body 12 to receive the carbide tip. The surfaces of the tip engaging the edges of the pocket are brazed to the body.

Body 12 has a central bore 40 concentric with its center of rotation 42 permitting the blade to be mounted on the arbor of a saw.

The major portion 44 of the peripheral edge of the body is generally circular, having a radius designated as $R_2$, also referred to herein as a second radius or distance from the center of rotation. In the region intermediate adjacent cutter teeth the major portion A of the peripheral edge is disposed at radius $R_2$.

A minor portion of the periphery of the body between adjacent cutter teeth for a distance B has the configuration illustrated in FIGS. 2 and 6 to provide a depth gauge section, or portion, 46 leading a cutter tooth.

The depth gauge section has a radially outwardly facing guide surface 48 which describes an arc at a radius $R_3$, also referred to herein as a third radius. The guide surface of the depth gauge section is connected with peripheral edge section 44 through a transition section 50, which curves from concave at 51 to convex at 53 on progressing from peripheral edge section 44 to guide surface 48. It has been found that this provides a smooth transition and operation of the saw blade if no part of the transition section 50 is disposed at an angle less than 150° from a line tangent to the peripheral edge from which it extends.

As is seen in FIG. 6, transition section 50 is beveled along opposite sides to produce a sharpened outer edge 52 which aids in a smooth operating transition from peripheral edge section 44 to guide surface 48.

A chip clearance channel 56, or gullet, extends radially inwardly from the periphery of the blade along the forward surface of cutter tip 14 to provide a pocket into which chips may be forced as they are cut from a work piece. This channel extends radially inwardly a distance F considerably below the level of the radius $R_2$.

For 5 inch to 15 inch diameter circular saw blades having from 0.16 to 1 tooth per circumferential inch and operating at between 3,000 and 6,000 rpm, it has been found that the following dimensional relationships produce an effective and smoothly operating blade. The depth gauge clearance, or distance, C between $R_1$ and $R_3$ may be in a range of 0.003 inch to 0.020 inch. The height D of the depth gauge portion 48 above the major peripheral edge 44 of the body may be in a range from 0.050 inch to 0.200 inch. The effective length of the depth gauge portion B may be in a range of 0.5 to 1.5 inches. The preferred width E of the chip clearance channel may be in a range of 0.030 inch to 0.100 inch. However, it has been found that a blade of this diameter will function well if width E extends to 0.250 inch. The length, or depth, F of the channel may be in a range of 0.100 inch of 0.300 inch.

With such construction a smooth transition for work engagement is provided between the major portion of the periphery of the saw blade 44 and the depth gauge guide portion 48, and a depth gauge setting, or clearance, is provided to control the depth of cut taken by each tooth. This produces not only a smooth and efficient cutting action, but also reduces the incidence of shock load which may impact a cutter tip and result in damage to the tip or tear the tip from the body portion. The controlled width of the chip clearance channel inhibits entry of materials of a size which may damage a tooth if too hard, but allows adequate chip clearance from the periphery of the blade.

Referring to FIG. 3, a segment of a somewhat similar saw blade is illustrated with a different form of chip clearance, or gullet, channel 60. Chip clearance channel 60 has a relatively straight portion 61 conforming generally in size to that previously described for 56, but at the radially inwardly end thereof it joins with an enlarged bore 62. This bore extends fully through the blade and provides a larger region, or reservoir, to accumulate chips prior to exit of the blade from a work piece. Chip clearance channel 61 and bore 62 together define a gullet leading cutter tooth 14. It will be seen that the gullet increases in size on progressing inwardly from the peripheral edge of the blade. Although a circular bore is illustrated as the inner portion of the gullet, it should be recognized that other configurations also may be used to perform the function of placing the depth gauge portion of the peripheral edge of the blade closely adjacent the forward surface of the cutter tooth while providing a fairly large chip-receiving reservoir, or region, spaced inwardly from the peripheral edge of the blade to receive chips without undesirable chip packing occurring.

FIGS. 4 and 5 illustrate a further embodiment of the invention. Here body 12 has a pocket 64 formed therein with opposed, substantially parallel, edge margins 66, 68 and a bottom 70 conforming to the configuration of tip 14 to be mounted therein. The edge margins of the pocket thus formed provide support for a major portion of the length of both the front and rear faces of the carbide tip against movement circumferentially of the blade. By providing both front and rear support for the tip there is less likelihood that it would be broken or torn from its mounting in the blade.

In this embodiment chip clearing channels are defined by indentations 72, 74 formed on opposite sides of the blade contiguous the front face of the cutter tip.

These indentations lead radially inwardly on the blade to a chip accumulating bore 76 similar to that previously described at 62. It has been found that a saw blade of 5 inch to 15 inch in diameter as described above works well with indentation having a depth of 0.010 inch to 0.040 inch as measured in a direction parallel to the axis of the blade.

The section of body 12 separating indentations 72, 74 forms a spine 78 engaging the front face of the tip. It has been found that improved chip clearance is provided by inclining the outer edge 80 of the spine radially inwardly at an acute angle to a line tangent to the periphery of the blade on progressing forwardly from the cutter tip.

Figure 8:
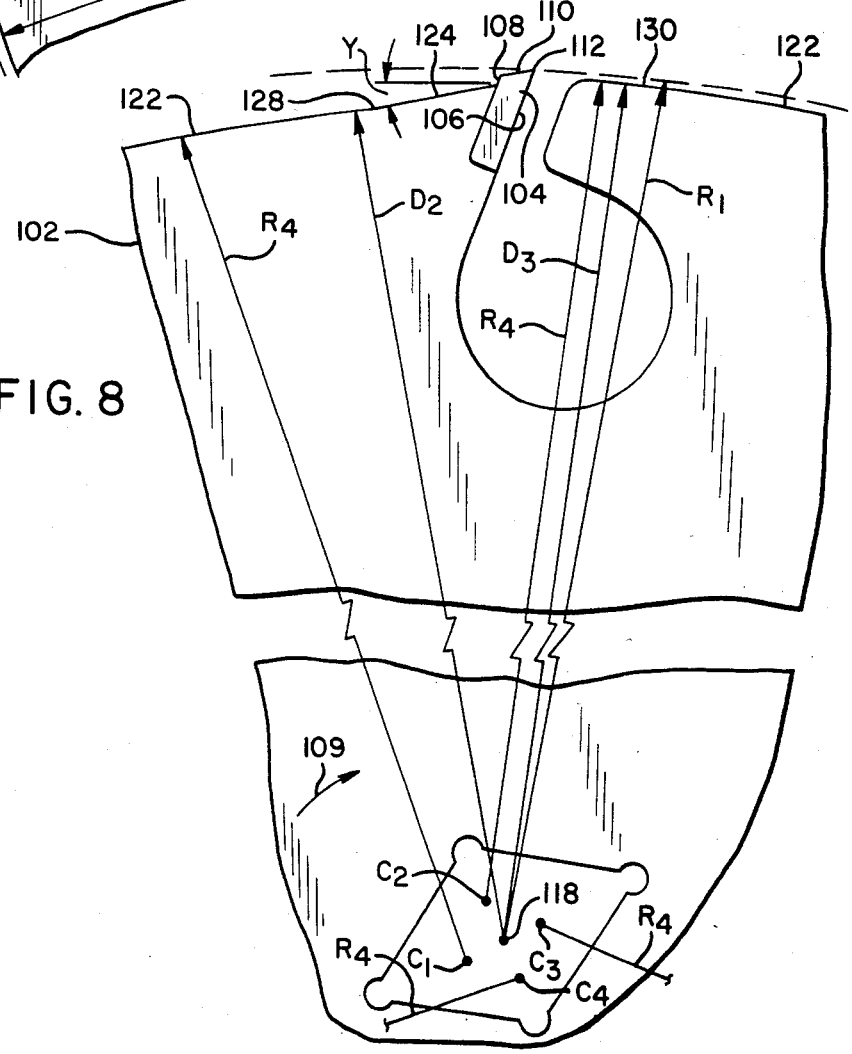
FIG. 8 is an enlarged illustration of a segment of the periphery and center of the blade of FIG. 7.

Referring to FIGS. 7 and 8, another embodiment of the invention is illustrated at 100. The blade includes a generally circular main body 102 having a plurality of circumferentially-spaced cutter teeth, or tips, 104 arrayed about the periphery thereof.

Referring to FIG. 8, it will be seen that a tip 104 has front and rear facing surfaces 106, 108, respectively, with the front surface facing in the direction of rotation 109 of the blade. The cutter tip also has a radially outwardly facing top surface 110. The intersection between faces 106 and 110 form an outer cutting edge 112. During operation of the blade cutting edge 112 described an arc at a pre-selected first radius, or distance, designated as $R_1$, from the center of rotation for the blade 118.

The major portion of the peripheral edge 122 of the main body produces a low angle ramp surface providing a depth gauge, or depth of cut control function. Explaining further, and referring to FIG. 8, it will be seen that a minor portion 124 of the peripheral edge of the blade engages the cutter tip rather high on its rear surface to provide maximum support for the tip. It then drops away at an angle "Y" of approximately 10° relative to a line tangent to the outer edge of the blade. A short distance rearwardly of the cutter tip, the peripheral edge of the blade reaches its low point at a first region 128 spaced a distance $D_2$ from the center of rotation 118 for the blade. The peripheral edge of the blade on progressing toward the next following cutter tip (counterclockwise in the drawings) extends in a substantially continuous convex curve which increases in distance from center point 118 until it reaches a maximum distance $D_3$ from center point 118 at a second region 130 adjacent the front face of the next cutter tooth. This gradual ramping from a minimum distance $D_2$ to the maximum distance $D_3$ is produced by forming the peripheral edge as a section of a circle having a radius $R_4$ which is rotated about a center point which is offset laterally, or radially, from the center of rotation 118 of the blade. In FIGS. 7 and 8 the center points for four separate ramping segments between the four teeth on the blade are designated at $C_1$, $C_2$, $C_3$, $C_4$, respectively.

With such construction a low angle ramping effect is provided intermediate adjacent cutter tips, with the highest point of the peripheral edge 130 being adjacent the front face of a cutter tip to provide the desired depth gauge clearance between the top of the peripheral edge surface and cutting edge 112 of the cutter tip. The depth gauge setting, or difference, between $R_1$ and $D_3$ may correspond to the depth gauge setting, or clearance, set out above for the previously-described embodiment. In summary, for a 5 inch to 15 inch diameter blade having from 0.16 to 1 tooth per circumferential inch and operating at 3,000 to 6,000 rpm the difference between $R_1$ and $D_3$ may be in a range from 0.003 inch to 0.020 inch and the difference between $D_3$ and $D_2$ may be in a range from 0.050 inch to 0.200 inch.

In the embodiment illustrated in FIGS. 7 and 8, chip clearance channels similar to that illustrated in FIG. 3 are provided. However, it will be recognized that other forms of chip clearance channels may be provided.

The circular saw blades thus described by having depth gauge portions leading the cutter tips provide control for the depth of cut to be taken by each cutter tip and thus allow a minimum number of teeth to be provided on the blade. Reduction of the number of teeth over conventionally known saw blades results in substantial economies in manufacture of the blade. With the peripheral edge portions of the blade which act as depth gauge sections having smoothly curved surfaces, a smoothly operating, efficient blade is provided. The chip clearing channels provide for efficient clearing of chips from the periphery of the blade while being constructed to minimize the occurrence of detrimental shock loads to a tip element. Provision of means for supporting both the front and rear surfaces of a cutter element in the blade minimizes tip breakage.

It should be recognized that the example dimensions recited herein are such as have been found to produce optimum conditions. Variation from the specific measurements noted would allow the device to perform its intended function, but may not work as well and could produce rougher cutting than with the measurements noted.

While preferred embodiments of the invention have been described herein, it should be apparent to those skilled in the art that further variations and modifications may be made without departing from the spirit of the invention.

I claim:

1. A saw blade comprising a substantially circular integral main body with a plurality of circumferentially spaced cutter tips secured thereto and projecting radially outwardly therefrom, the outer end of a tip being positioned to describe an arc during rotation of the blade which is at a first radius, a tip having a front surface in the direction of rotation of said blade during operation, said main body having a peripheral edge defining a circular arc at a second radius throughout a major portion of its circumference, a depth gauge portion on said main body associated with and leading a tip and having a radially outwardly facing guide surface which describes an arc at a third radius during rotation which is intermediate said first and second radii, said guide surface of the depth gauge portion being connected with the peripheral edge of said main body through a transition section which curves from concave to convex on progressing from said peripheral edge to said guide surface, and a chip clearance channel intermediate said front face of a cutter tip and its associated depth gauge, said channel extending generally radially inwardly from said guide surface to a region spaced radially inwardly from said second radius and having a width measured circumferentially of said blade in a range of 0.030 to 0.100 inch.

2. The blade of claim 1, wherein a cutter tip comprises an element secured in a pocket defined in said main body by edge margins of the body, which edge margins support both the front face and an opposed rear face of said element against movement circumferentially of said body, and said channel comprises an indentation in a side face of said blade adjacent the front face of said cutter tip.

3. The blade of claim 5, wherein the portion of said body in which said indentation is defined forms a tip-supporting spine, the radially outwardly facing surface of which spine on progressing forwardly from said front surface of the tip extends radially inwardly at an acute angle relative to a line tangent to the periphery of said depth gauge portion adjacent said tip.

4. The blade of claim 2, wherein said indentation has a depth measured in a direction extending parallel to the axis of the blade in a range of 0.010 inch of 0.040 inch.

5. The blade of claim 1, wherein said chip clearance channel further comprises an enlarged bore extending through said body and spaced radially inwardly from said second radius.

6. The blade of claim 1, wherein said body is composed of a material of a first hardness and a cutting tip is composed of a material of a hardness greater than said first hardness.

7. The blade of claim 1, wherein a depth gauge portion occupies a minor portion of the periphery of said body between adjacent cutter tips.

8. The blade of claim 1, wherein said first radius minus said third radius is in a range of 0.003 inch to 0.020 inch.

9. The blade of claim 1, wherein said third radius minus said second radius is in a range of 0.050 inch to 0.200 inch.

* * * * *